United States Patent
Okamoto et al.

(10) Patent No.: US 8,531,591 B2
(45) Date of Patent: Sep. 10, 2013

(54) POWER-SUPPLY-NOISE CANCELLING CIRCUIT AND SOLID-STATE IMAGING DEVICE

(75) Inventors: Ryuta Okamoto, Tokyo (JP); Kazumasa Sanada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 631 days.

(21) Appl. No.: 12/725,870

(22) Filed: Mar. 17, 2010

(65) Prior Publication Data

US 2010/0238336 A1    Sep. 23, 2010

(30) Foreign Application Priority Data

May 22, 2009 (JP) ................................. 2009-123821

(51) Int. Cl.
*H04N 5/225* (2006.01)
*H04N 5/217* (2011.01)
*H04N 5/335* (2011.01)

(52) U.S. Cl.
USPC ............................ 348/372; 348/241; 348/294

(58) Field of Classification Search
USPC .................. 348/241, 257, 372, 272, 294, 311
See application file for complete search history.

(56) References Cited

U.S. PATENT DOCUMENTS

| 6,476,867 | B1 | 11/2002 | Kobayashi et al. |
| 6,911,640 | B1* | 6/2005 | Bencuya et al. ........... 250/208.1 |
| 7,345,613 | B2 | 3/2008 | Higushi |
| 7,440,012 | B2* | 10/2008 | Borg et al. .................. 348/229.1 |
| 7,830,432 | B2* | 11/2010 | Henderson .................... 348/294 |
| 2009/0236644 | A1* | 9/2009 | Adkisson et al. ............. 257/292 |
| 2010/0176875 | A1* | 7/2010 | Pulijala et al. ................ 327/538 |
| 2012/0194724 | A1* | 8/2012 | Watanabe et al. ............. 348/311 |

FOREIGN PATENT DOCUMENTS

| JP | 9-92807 | 4/1997 |
| JP | 2007-324984 | 12/2007 |
| JP | 2008-11284 | 1/2008 |

* cited by examiner

*Primary Examiner* — Tuan Ho
*Assistant Examiner* — Peter Chon
(74) *Attorney, Agent, or Firm* — Oblon, Spivak, McClelland, Maier & Neustadt, L.L.P.

(57) ABSTRACT

A power supply voltage containing a noise component is supplied to each pixel at the time of sampling of a reset level of a signal read out from each pixel, and a power supply voltage in which the noise component is suppressed is supplied to each pixel at the time of sampling of a read level of the signal read out from each pixel.

13 Claims, 10 Drawing Sheets

POWER-SUPPLY-NOISE CANCELLING CIRCUIT AND SOLID-STATE IMAGING DEVICE

CROSS-REFERENCE TO RELATED APPLICATIONS

This application is based upon and claims the benefit of priority from the prior Japanese Patent Application No. 2009-123821, filed on May 22, 2009; the entire contents of which are incorporated herein by reference.

BACKGROUND OF THE INVENTION

1. Field of the Invention

The present invention relates to a power-supply-noise cancelling circuit and a solid-state imaging device, and more particularly, is suitably applied to a method of cancelling power supply noise superimposed on a pixel output signal of a CMOS image sensor.

2. Description of the Related Art

In a CMOS image sensor, a signal from each pixel is sent to a sample-hold signal conversion circuit through a vertical signal line, and a signal component of the signal is detected by CDS (Correlated Double Sampling).

Assuming that a reset-level sampling voltage is Vc and a read-level sampling voltage is Vs, the signal component detected by CDS is given by Vc-Vs.

Meanwhile, when power supply noise is superimposed on the signal from each pixel, the signal component detected by CDS is given by the following Equation (1):

$$(Vc+\Delta Vc)-(Vs+\Delta Vs)=(Vc-Vs)+(\Delta Vc-\Delta Vs) \quad (1)$$

where $\Delta Vc$ is power supply noise at the time of sampling of the reset level and $\Delta Vs$ is power supply noise at the time of sampling of the read level.

In this case, when values of the power supply noise $\Delta Vc$ and the power supply noise $\Delta Vs$ are equal to each other, the power supply noise $\Delta Vc$ and the power supply noise $\Delta Vs$ cancel out each other and degradation of image quality because of the power supply noise $\Delta Vc$ and the power supply noise $\Delta Vs$ does not occur. However, because the power supply noise $\Delta Vc$ and the power supply noise $\Delta Vs$ occur randomly, the values of the power supply noise $\Delta Vc$ and the power supply noise $\Delta Vs$ are generally different from each other.

A method of reducing noise is disclosed in, for example, Japanese Patent Application Laid-open No. 2008-11284, in which an averaging process is performed on a plurality of digital code values obtained by repeating AD conversion multiple times on a difference between potential at the time of reset of an imaging device and potential after exposure of the imaging device.

However, in the method disclosed in Japanese Patent Application Laid-open No. 2008-11284, because the averaging process is performed on the difference between the potential at the time of reset of the imaging device and the potential after the exposure of the imaging device to reduce the noise, an actual signal component at the time of sampling of the read level may not be extracted and resolution may be degraded accordingly. Furthermore, because sampling of a signal from an identical pixel needs to be performed multiple times, processing time may be increased.

BRIEF SUMMARY OF THE INVENTION

A power-supply-noise cancelling circuit according to an embodiment of the present invention comprises: a switching unit that switches between a power supply voltage containing a noise component and a power supply voltage in which the noise component is suppressed, and supplies switched power supply voltage to each pixel of an imaging element; and a timing generator that controls the switching unit so that the power supply voltage containing the noise component is supplied to the pixels at the time of sampling of a reset level of a signal read out from the pixels and the power supply voltage in which the noise component is suppressed is supplied to the pixels at the time of sampling of a read level of a signal read out from the pixels.

A power-supply-noise cancelling circuit according to an embodiment of the present invention comprises: a logic circuit that generates a differential signal by performing processing on a signal read out from each pixel of an imaging element; a regulator that generates a power supply voltage in which a noise component is suppressed and supplies the power supply voltage to the logic circuit; a booster circuit that boosts the power supply voltage in which the noise component is suppressed by the regulator; a switching unit that switches between a power supply voltage containing a noise component and the power supply voltage boosted by the booster circuit, and supplies switched power supply voltage to each pixel of the imaging element; and a timing generator that controls the switching unit so that the power supply voltage containing the noise component is supplied to the pixels at the time of sampling of a reset level of a signal read out from the pixels, and the power supply voltage boosted by the booster circuit is supplied to the pixels at the time of sampling of a read level of a signal read out from the pixels.

A power-supply-noise cancelling circuit according to an embodiment of the present invention comprises: a switching unit that switches between a first power supply voltage and a second power supply voltage generated from the first power supply voltage via a regulator, and supplies switched power supply voltage to each pixel of an imaging element; and a timing generator that controls the switching unit so that the first power supply voltage is supplied to the pixels at the time of sampling of a reset level of a signal read out from the pixels and the second power supply voltage is supplied to the pixels at the time of sampling of a read level of a signal read out from the pixels.

A solid-state imaging device according to an embodiment of the present invention comprises: a pixel array in which pixels are arrayed in a matrix form; a sample-hold signal conversion circuit that detects a signal component read out from the pixels by CDS; a vertical signal line for transferring a signal read out from the pixels to the sample-hold signal conversion circuit; a switching unit that switches between a power supply voltage containing a noise component and a power supply voltage in which the noise component is suppressed, and supplies switched power supply voltage to each pixel of the pixel array; and a timing generator that controls the switching unit so that the power supply voltage containing the noise component is supplied to the pixels at the time of sampling of a reset level of a signal read out from the pixels, and the power supply voltage in which the noise component is suppressed is supplied to the pixels at the time of sampling of a read level of a signal read out from the pixels.

DETAILED DESCRIPTION OF THE INVENTION

Exemplary embodiments of a power-supply-noise cancelling circuit according to the present invention will be explained below with reference to the accompanying drawings. In the following explanation, the power-supply-noise cancelling circuit applied to a CMOS image sensor will be described as an example. However, the present invention is not limited by the following embodiments.

(First Embodiment)

Figure 1:
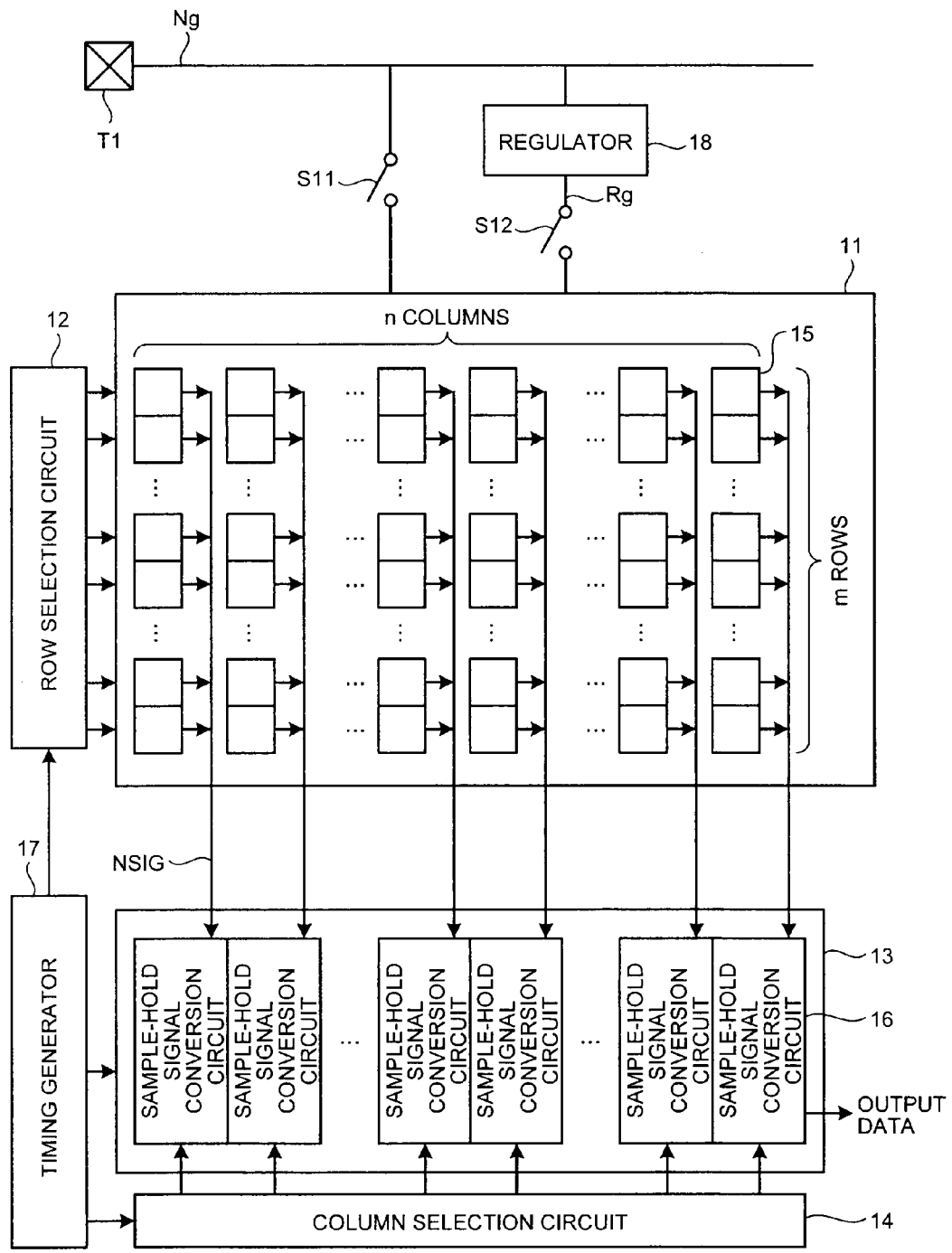
FIG. 1 is a block diagram of a general configuration of a CMOS image sensor to which a power-supply-noise cancelling circuit according to a first embodiment of the present invention is applied.

FIG. 1 is a block diagram of a general configuration of a CMOS image sensor to which a power-supply-noise cancelling circuit according to a first embodiment of the present invention is applied.

In FIG. 1, the CMOS image sensor includes a pixel array 11, a row selection circuit 12, a sample-hold signal conversion circuit group 13, a column selection circuit 14, a timing generator 17, a regulator 18, switches S11 and S12, and a power supply terminal T1. In the pixel array 11, pixels 15 that perform photoelectric conversion are arrayed in m rows and n columns (m and n are integers equal to or larger than 1). The row selection circuit 12 is able to select a row in which the pixel 15 to be a read target is arrayed. The column selection circuit 14 is able to select a column in which the pixel 15 to be the read target is arrayed. In the sample-hold signal conversion circuit group 13, sample-hold signal conversion circuits 16 are arranged for respective columns of the array of the pixels 15.

The sample-hold signal conversion circuits 16 are connected to each pixel 15 via respective vertical signal lines NSIG per column. The sample-hold signal conversion circuits 16 are able to detect a signal component by CDS when a signal is read out from each pixel 15. The regulator 18 is able to generate a power supply voltage Rg (a second power supply voltage) in which a noise component is suppressed, from a power supply voltage Ng (a first power supply voltage) containing a noise component. The switch S11 is able to switch a power supply voltage to be supplied to each pixel 15 to the power supply voltage Ng containing the noise component. The switch S12 is able to switch a power supply voltage to be supplied to each pixel 15 to the power supply voltage Rg in which a noise component is suppressed. The timing generator 17 is able to control timing to operate the row selection circuit 12, the sample-hold signal conversion circuit group 13, the column selection circuit 14, and the switches S11 and S12. The power supply terminal T1 is able to input the power supply voltage Ng. The power supply voltage Ng may be superimposed with power supply noise.

In the first embodiment illustrated in FIG. 1, a method is described in which the sample-hold signal conversion circuits 16 are used to detect a signal read out from each pixel 15. However, an ADC (Analog Digital Converter) circuit may be used instead of the sample-hold signal conversion circuits 16.

Figure 2:
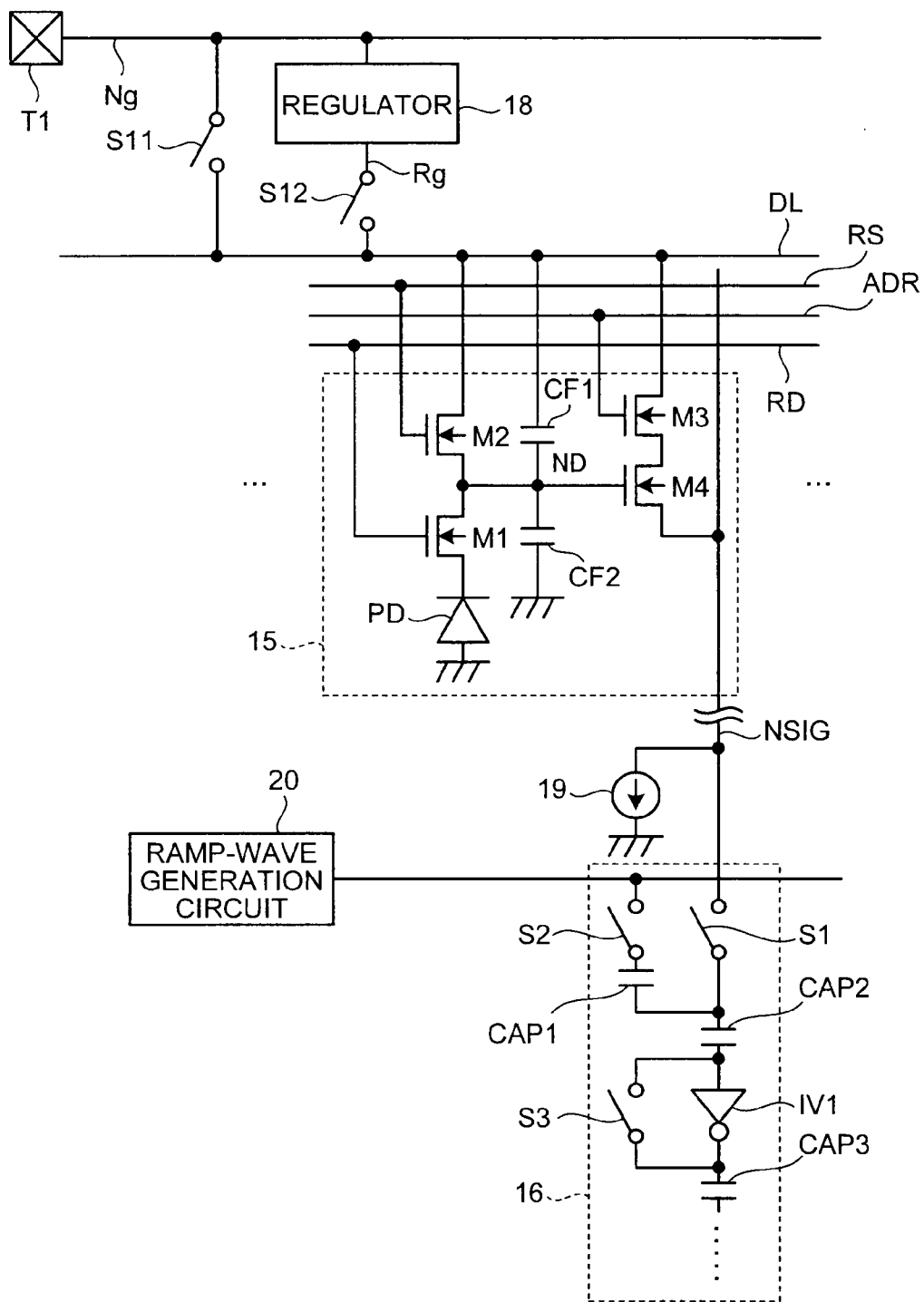
FIG. 2 is a diagram illustrating an example of a circuit configuration of a pixel illustrated in FIG. 1.

FIG. 2 is a diagram illustrating an example of a circuit configuration of a pixel illustrated in FIG. 1.

In FIG. 2, each pixel 15 illustrated in FIG. 1 includes a photodiode PD that performs photoelectric conversion, a read transistor M1 that reads out charge stored in the photodiode PD to a storage node ND, a reset transistor M2 that resets charge stored in the storage node ND, a row selection transistor M3 that selects a row, and a transfer transistor M4 that transfers charge stored in the storage node ND to a vertical signal line. Here, a floating diffusion for example may be used as the storage node ND.

A source of the read transistor M1 is connected to the photodiode PD, and a gate of the read transistor M1 is connected to a read signal line RD. A source of the reset transistor M2 is connected to a drain of the read transistor M1, a gate of the reset transistor M2 is connected to a reset signal line RS, and a drain of the reset transistor M2 is connected to a power line DL. A gate of the row selection transistor M3 is connected to a row selection line ADR, and a drain of the row selection transistor M3 is connected to the power line DL. A source of the transfer transistor M4 is connected to a current source 19 and the sample-hold signal conversion circuit 16 via the vertical signal line NSIG, a gate of the transfer transistor M4 is connected to the drain of the read transistor M1, and a drain of the transfer transistor M4 is connected to a source of the row selection transistor M3.

The power line DL is connected to the power supply terminal T1 via the switch S11, and to the power supply terminal T1 via the switch S12 and the regulator 18 in series.

In this case, parasitic capacitance CF1 is present between the gate of the transfer transistor M4 and the power line DL, and parasitic capacitance CF2 is present between the gate of the transfer transistor M4 and the ground.

The sample-hold signal conversion circuit 16 includes switches S1 to S3, capacitors CAP1 to CAP3, and an inverter IV1. The timing generator 17 illustrated in FIG. 1 includes a ramp-wave generation circuit 20 that generates a ramp-wave signal.

One end of the capacitor CAP1 is connected to the ramp-wave generation circuit 20 via the switch S2. One end of the capacitor CAP2 is connected to the other end of the capacitor CAP1, and to the vertical signal line NSIG via the switch S1. The other end of the capacitor CAP2 is connected to the capacitor CAP3 via the inverter IV1.

In the example illustrated in FIG. 2, a method of arranging the row selection transistor M3 and the row selection line ADR in each pixel 15 illustrated in FIG. 1 is described.

However, it is possible to omit the row selection transistor M3 and the row selection line ADR.

Figure 3:
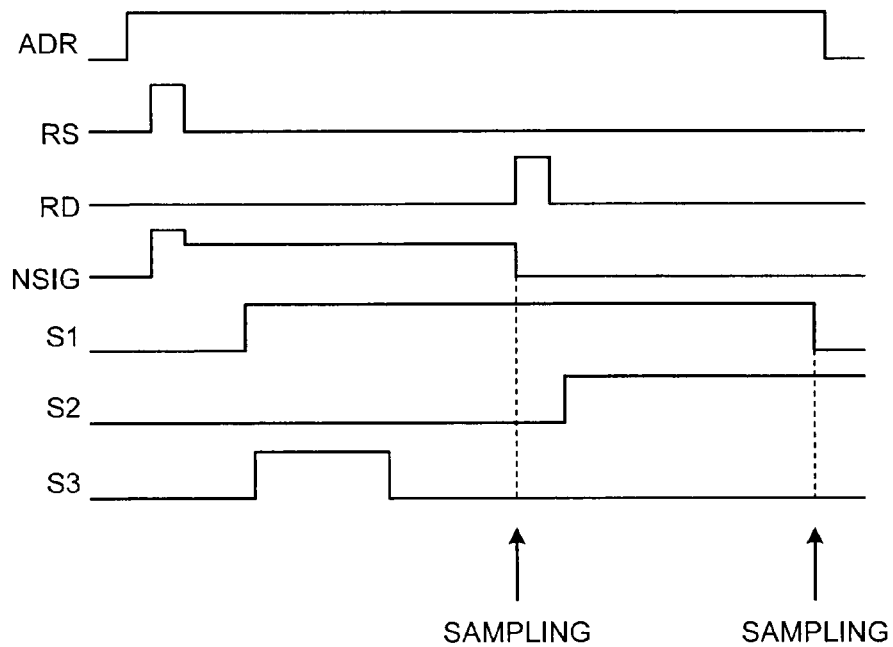
FIG. 3 is a timing diagram illustrating signal waveforms of respective units of the CMOS image sensor when switches S1 to S3 illustrated in FIG. 2 are turned on and off.

FIG. 3 is a timing diagram illustrating signal waveforms of respective units of the CMOS image sensor when the switches S1 to S3 illustrated in FIG. 2 are turned on and off.

In FIG. 3, when a signal is to be read out from the pixel 15 illustrated in FIG. 2, the row selection circuit 12 selects a row in which the pixel 15 is arranged, and the potential of the row selection line ADR corresponding to the row is changed from a low level to a high level. When the potential of the row selection line ADR is changed from the low level to the high level, the row selection transistor M3 illustrated in FIG. 2 is turned on.

When the row selection transistor M3 illustrated in FIG. 2 is turned on, a reset pulse is output to the reset signal line RS. When the reset pulse is output to the reset signal line RS, the reset transistor M2 is turned on. When the reset transistor M2 is turned on, the transfer transistor M4 is turned on and the vertical signal line NSIG is connected to the power line DL. Accordingly, the potential of the vertical signal line NSIG is shifted to a reset level.

Specifically, when the potential of the vertical signal line NSIG is to be shifted to the reset level, the timing generator 17 illustrated in FIG. 1 turns off the switches S1 to S3, so that the vertical signal line NSIG is disconnected from the sample-hold signal conversion circuit 16.

Then, when the sample-hold signal conversion circuit 16 performs sampling of the reset level, the timing generator 17 turns on the switches S1 and S3. When the switch S1 is turned on, the vertical signal line NSIG is connected to the sample-hold signal conversion circuit 16, so that a voltage at one end of the capacitor CAP2 reaches the voltage of the vertical signal line NSIG. Furthermore, when the switch S3 is turned on, an output terminal of the inverter IV1 and an input terminal of the inverter IV1 are short circuited, so that a voltage at the other end of the capacitor CAP2 reaches an output voltage of the inverter IV1.

Subsequently, when the timing generator 17 turns off the switch S3, the other end of the capacitor CAP2 is disconnected from the output terminal of the inverter IV1, and charge corresponding to a differential voltage between a voltage of the vertical signal line NSIG and an input voltage of the inverter IV1 is stored in the capacitor CAP2.

Then, when a read pulse is output to the read signal line RD, the read transistor M1 is turned on. When the read transistor M1 is turned on, a voltage corresponding to the amount of charge stored in the photodiode PD is applied to the gate of the transfer transistor M4. In this case, because the transfer transistor M4 and the current source 19 function as a source follower, when the voltage corresponding to the amount of the charge stored in the photodiode PD is applied to the gate of the transfer transistor M4, the voltage of the vertical signal line NSIG follows the applied voltage, so that the voltage of the vertical signal line NSIG is shifted to a read level.

When the potential of the vertical signal line NSIG is shifted to the read level, the timing generator 17 turns on the switch S2. When the switch S2 is turned on, the capacitor CAP1 is connected to the ramp-wave generation circuit 20.

Next, when the sample-hold signal conversion circuit 16 performs sampling of the read level, the timing generator 17 turns off the switch S1. When the switch S1 is turned off, the capacitors CAP1 and CAP2 are disconnected from the vertical signal line NSIG. When the capacitors CAP1 and CAP2 are disconnected from the vertical signal line NSIG, a voltage of the input terminal of the inverter IV1 is changed by the same value as the amount of change in a voltage at a connection point between the capacitors CAP1 and CAP2, so that the voltage of the input terminal of the inverter IV1 is inverted and output to the capacitor CAP3.

Figure 4:
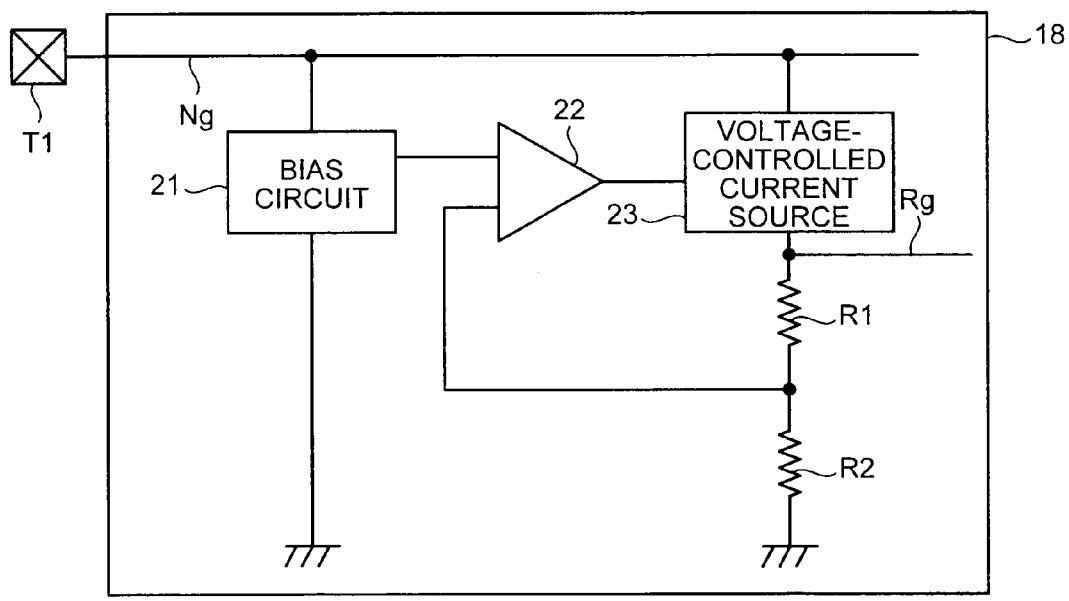
FIG. 4 is a block diagram of a general configuration of a regulator illustrated in FIG. 1.

FIG. 4 is a block diagram of a general configuration of the regulator 18 illustrated in FIG. 1.

In FIG. 4, the regulator 18 includes a bias circuit 21, an error amplifier 22, a voltage-controlled current source 23, and resistors R1 and R2. The bias circuit 21 is able to generate a reference voltage Vref, and supply it to the error amplifier 22. The error amplifier 22 is able to compare the power supply voltage Rg divided by the resistors R1 and R2 with the reference voltage Vref, amplify a differential voltage between the compared voltages, and output the amplified voltage to the voltage-controlled current source 23. The voltage-controlled current source 23 is able to generate the power supply voltage Rg by controlling a current flowing into the resistors R1 and R2 so that a voltage output from the error amplifier 22 comes closer to 0. The resistors R1 and R2 are connected in series and able to divide the power supply voltage Rg and output the divided voltage to the error amplifier 22.

When the power supply voltage Ng supplied to the power supply terminal T1 is input to the regulator 18, the power supply voltage Ng is supplied to the bias circuit 21 and the voltage-controlled current source 23. When the power supply voltage Ng is supplied to the bias circuit 21, the reference voltage Vref is generated from the power supply voltage Ng and supplied to the error amplifier 22.

Furthermore, when the power supply voltage Ng is supplied to the voltage-controlled current source 23, a current flowing into the resistors R1 and R2 is controlled, so that the power supply voltage Rg is generated. When the voltage-controlled current source 23 generates the power supply voltage Rg, the power supply voltage Rg is divided by the resistors R1 and R2 and then output to the error amplifier 22.

When the power supply voltage Rg divided by the resistors R1 and R2 and the reference voltage Vref are input to the error amplifier 22, a differential voltage between the input voltages are amplified and the amplified voltage is output to the voltage-controlled current source 23. Consequently, a current flowing into the resistors R1 and R2 is controlled so that the voltage output from the error amplifier 22 becomes 0.

Figure 5:
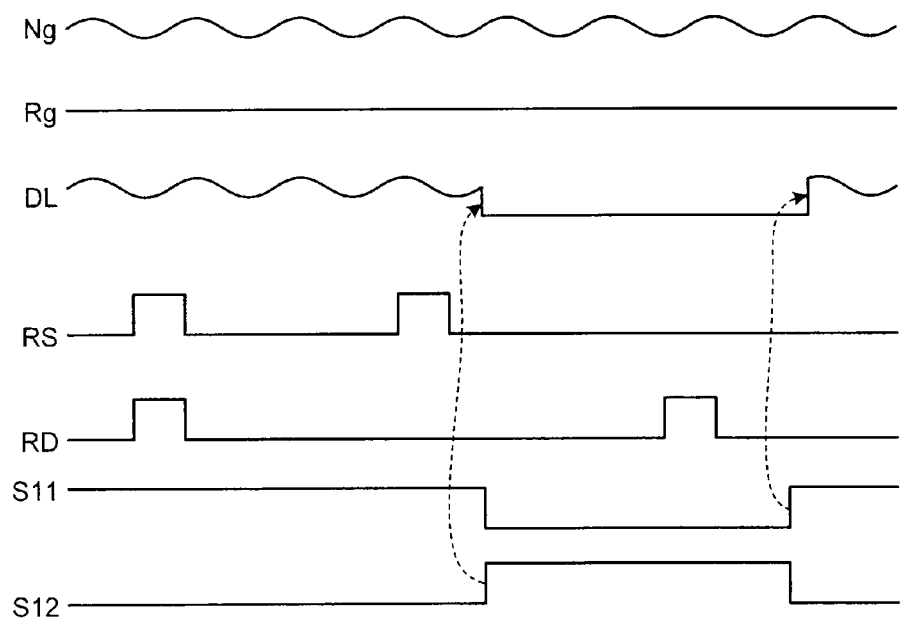
FIG. 5 is a timing diagram illustrating signal waveforms of respective units of the CMOS image sensor when switches S11 and S12 illustrated in FIG. 2 are turned on and off.

FIG. 5 is a timing diagram illustrating signal waveforms of respective units of the CMOS image sensor when the switches S11 and S12 illustrated in FIG. 2 are turned on and off.

In FIG. 5, when the signal from the pixel 15 illustrated in FIG. 2 is to be reset, the switch S11 is turned on and the switch S12 is turned off, so that the power supply voltage Ng supplied to the power supply terminal T1 is output to the power line DL.

When the reset pulse is output to the reset signal line RS and the read pulse is output to the read signal line RD while the power supply voltage Ng is being output to the power line DL, the read transistor M1 and the reset transistor M2 are turned on. When the read transistor M1 and the reset transistor M2 are turned on, the photodiode PD is connected to the power line DL and charge stored in the photodiode PD is reset.

Next, when a signal is to be read out from the pixel 15 illustrated in FIG. 2, the switch S11 is turned on and the switch S12 is turned off, so that the power supply voltage Ng supplied to the power supply terminal T1 is output to the power line DL.

When the reset pulse is output to the reset signal line RS while the power supply voltage Ng is being output to the power line DL, the reset transistor M2 is turned on. When the reset transistor M2 is turned on, the vertical signal line NSIG is connected to the power line DL, and the potential of the vertical signal line NSIG is shifted to the reset level. When the potential of the vertical signal line NSIG is shifted to the reset level, the sample-hold signal conversion circuit 16 performs sampling of the reset level.

When the sample-hold signal conversion circuit 16 performs the sampling of the reset level, the switch S11 is turned off and the switch S12 is turned on, so that the power supply voltage Rg generated by the regulator 18 is output to the power line DL.

When the read pulse is output to the read signal line RD while the power supply voltage Rg is being output to the power line DL, the read transistor M1 is turned on. When the read transistor M1 is turned on, a voltage corresponding to the amount of charge stored in the photodiode PD is applied to the gate of the transfer transistor M4, and the voltage of the vertical signal line NSIG is shifted to the read level. When the potential of the vertical signal line NSIG is shifted to the read level, the sample-hold signal conversion circuit 16 performs sampling of the read level.

Consequently, it is possible to supply the power supply voltage Ng to the pixels 15 during the sampling of the reset level, and supply the power supply voltage Rg, which is made stable by the regulator 18, to the pixels 15 during the sampling of the read level. Therefore, it is possible to suppress power supply noise of the power supply voltage Rg to be supplied to the pixels 15 at the time of the sampling of the read level, without decreasing a value of the power supply voltage Ng to be supplied to the pixels 15 at the time of the sampling of the reset level. As a result, it is possible to improve an S/N ratio of a signal read out from the pixels 15 without degrading output performance of charge at the time of the sampling of the reset level.

(Second Embodiment)

Figure 6:
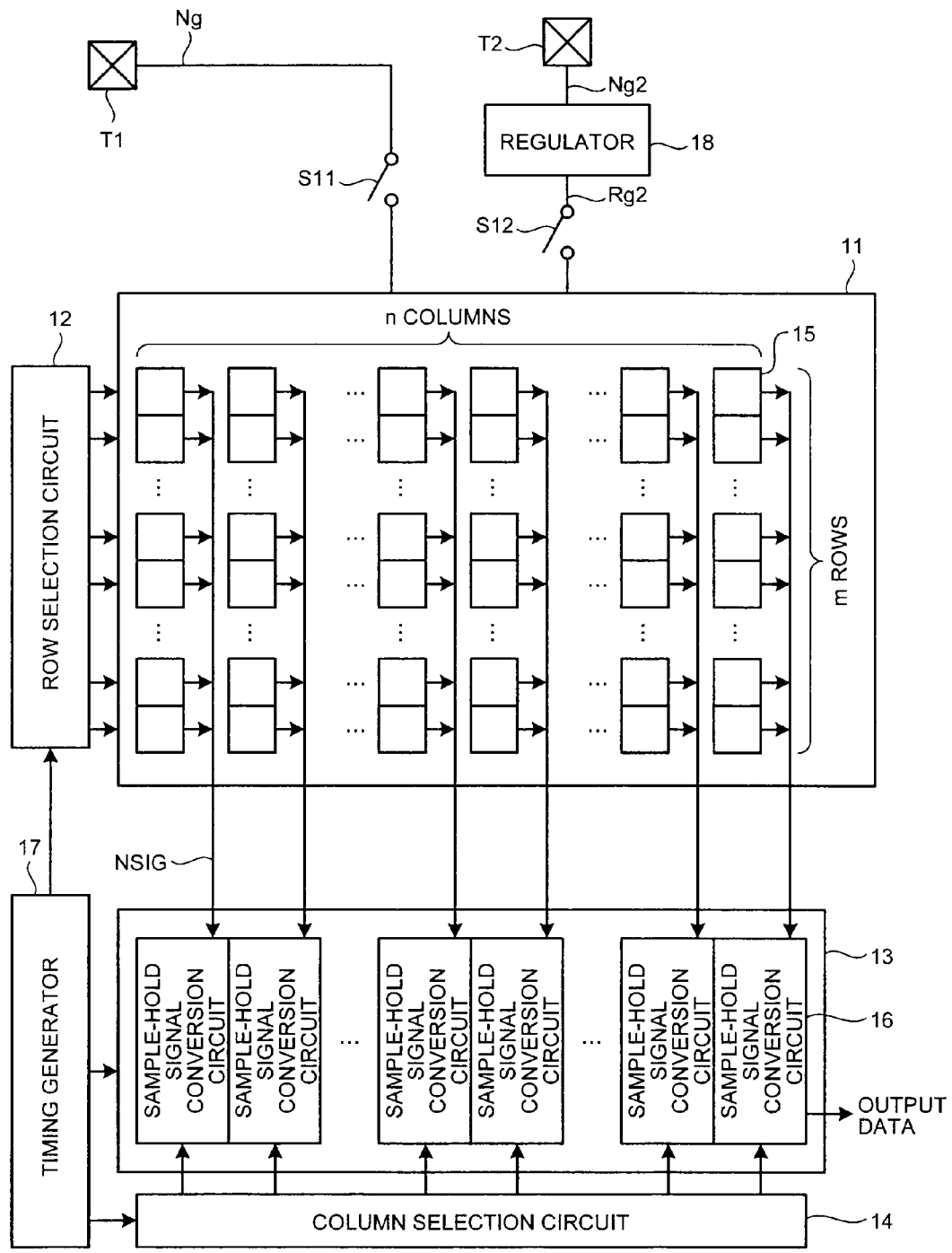
FIG. 6 is a block diagram of a general configuration of a CMOS image sensor to which a power-supply-noise cancelling circuit according to a second embodiment of the present invention is applied.

FIG. 6 is a block diagram of a general configuration of a CMOS image sensor to which a power-supply-noise cancelling circuit according to a second embodiment of the present invention is applied.

In FIG. 6, the CMOS image sensor includes a power supply terminal T2 in addition to the configuration of the CMOS image sensor illustrated in FIG. 1. The power supply terminal T2 is able to input a power supply voltage Ng2 having a voltage value larger than that of the power supply voltage Ng and supply the power supply voltage Ng2 to the regulator 18. The power supply voltage Ng2 may be superimposed with power supply noise.

Figure 7:
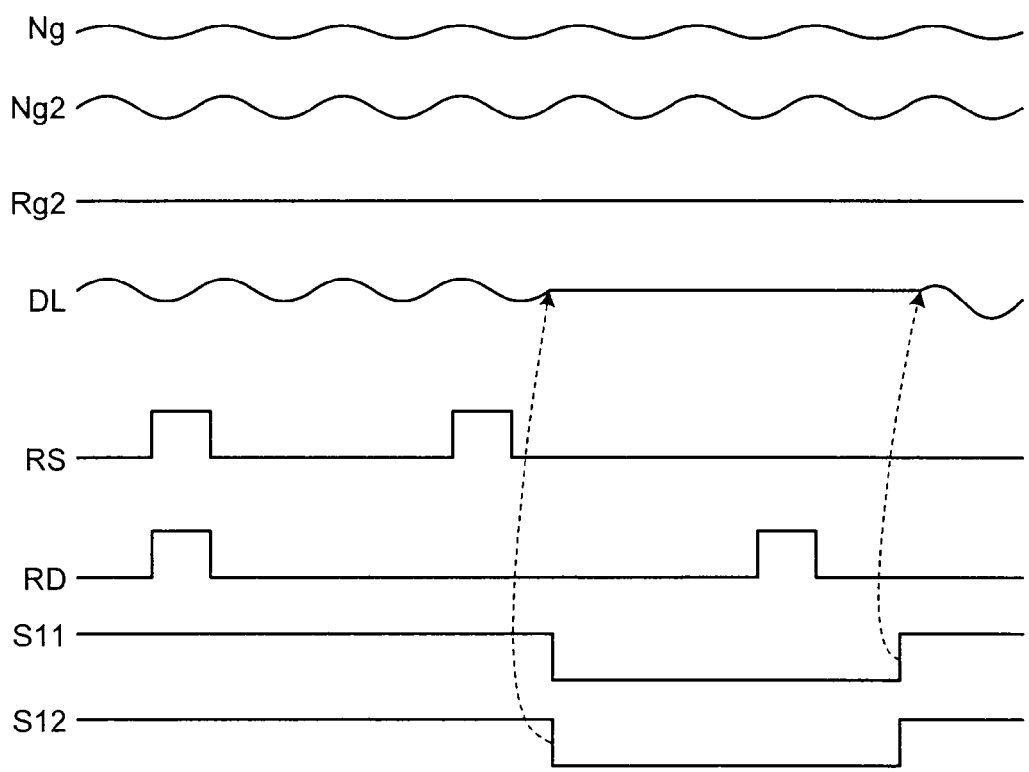
FIG. 7 is a timing diagram illustrating signal waveforms of respective units of the CMOS image sensor when switches S11 and S12 illustrated in FIG. 6 are turned on and off.

FIG. 7 is a timing diagram illustrating signal waveforms of respective units of the CMOS image sensor when the switches S11 and S12 illustrated in FIG. 6 are turned on and off.

In FIG. 7, when the power supply voltage Ng2 is supplied to the power supply terminal T2, the power supply voltage Ng2 is output to the regulator 18. When the power supply voltage Ng2 is output to the regulator 18, a power supply voltage Rg2 in which power supply noise of the power supply voltage Ng2 is suppressed is generated.

When the signal from the pixels 15 illustrated in FIG. 6 is to be reset, the switch S11 is turned on and the switch S12 is turned off, so that the power supply voltage Ng supplied to the power supply terminal T1 is output to the power line DL.

When the reset pulse is output to the reset signal line RS and the read pulse is output to the read signal line RD while the power supply voltage Ng is being output to the power line DL, the read transistor M1 and the reset transistor M2 are turned on. When the read transistor M1 and the reset transistor M2 are turned on, the photodiode PD is connected to the power line DL, so that charge stored in the photodiode PD is reset.

Next, when a signal is to be read out from the pixels 15 illustrated in FIG. 6, the switch S11 is turned on and the switch S12 is turned off, so that the power supply voltage Ng supplied to the power supply terminal T1 is output to the power line DL.

When the reset pulse is output to the reset signal line RS while the power supply voltage Ng is being output to the power line DL, the reset transistor M2 is turned on. When the reset transistor M2 is turned on, the vertical signal line NSIG is connected to the power line DL, and the potential of the vertical signal line NSIG is shifted to the reset level accordingly. When the potential of the vertical signal line NSIG is shifted to the reset level, the sample-hold signal conversion circuit 16 performs sampling of the reset level.

When the sample-hold signal conversion circuit 16 performs the sampling of the reset level, the switch S11 is turned off and the switch S12 is turned on, so that the power supply voltage Rg2 generated by the regulator 18 is output to the power line DL.

When the read pulse is output to the read signal line RD while the power supply voltage Rg2 is being output to the power line DL, the read transistor M1 is turned on. When the read transistor M1 is turned on, a voltage corresponding to the amount of charge stored in the photodiode PD is applied to the gate of the transfer transistor M4, so that the voltage of the vertical signal line NSIG is shifted to the read level. When the potential of the vertical signal line NSIG is shifted to the read level, the sample-hold signal conversion circuit 16 performs sampling of the read level.

Consequently, it is possible to cause the regulator 18 to generate the power supply voltage Rg2 from the power supply voltage Ng2 having a voltage value larger than that of the power supply voltage Ng at the time of the sampling of the read level, and the power supply voltage Rg2, which is made stable by the regulator 18, can be supplied to the pixels 15. Therefore, it is possible to suppress power supply noise of the power supply voltage Rg2 to be supplied to the pixels 15, without degrading read performance at the time of the sampling of the read level. As a result, it is possible to improve an S/N ratio of a signal read out from the pixels 15 without decreasing a read speed.

In this case, the voltage value of the power supply voltage Ng may be 2.8 V for example, and the voltage value of the power supply voltage Ng2 may be 3.3 V to 3.6 V for example.

In the second embodiment illustrated in FIG. 6, a method is described in which the sample-hold signal conversion circuits 16 are used to detect a signal read out from each pixel 15. However, an ADC circuit may be used instead of the sample-hold signal conversion circuits 16.

(Third Embodiment)

Figure 8:
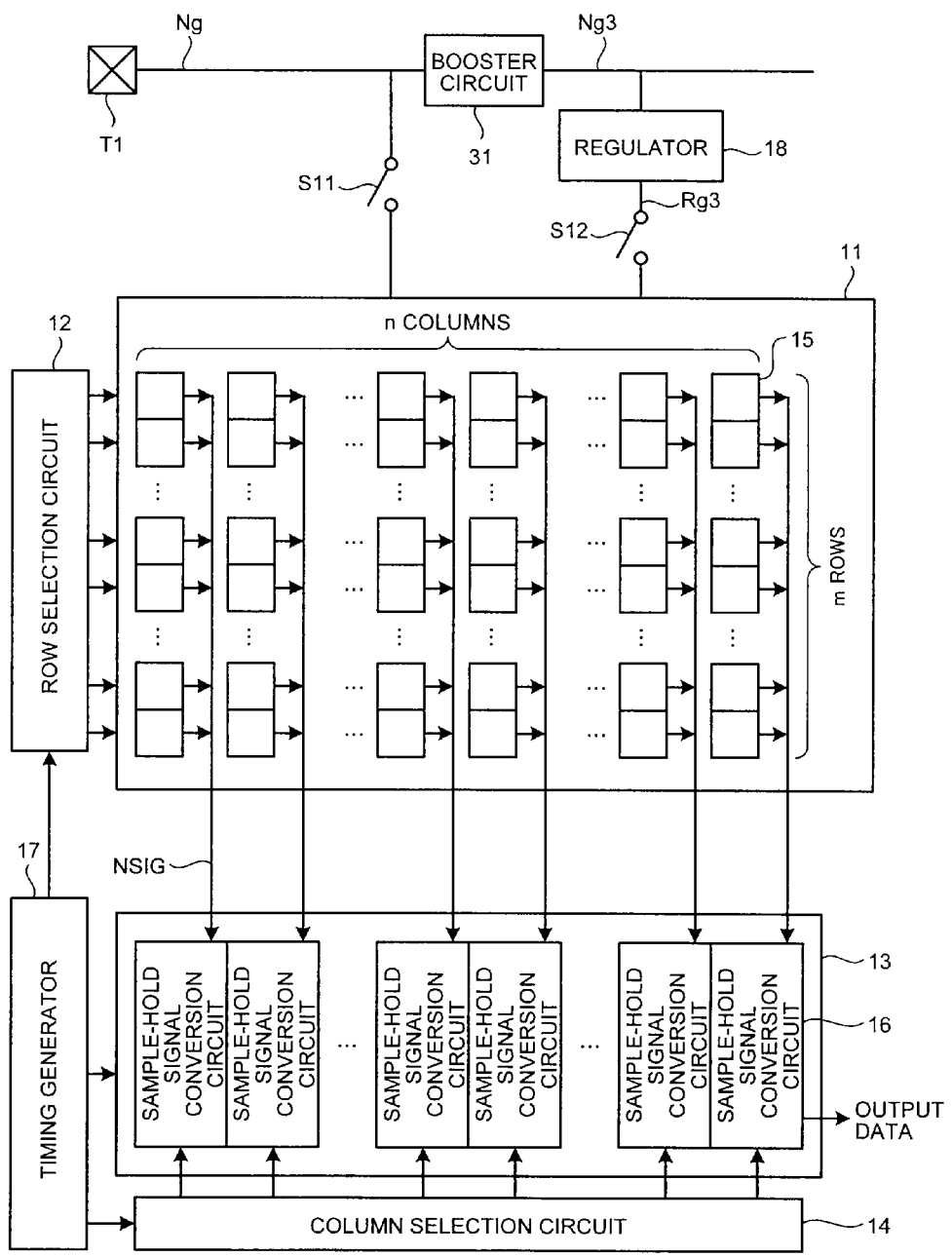
FIG. 8 is a block diagram of a general configuration of a CMOS image sensor to which a power-supply-noise cancelling circuit according to a third embodiment of the present invention is applied.

FIG. 8 is a block diagram of a general configuration of a CMOS image sensor to which a power-supply-noise cancelling circuit according to a third embodiment of the present invention is applied.

In FIG. 8, the CMOS image sensor includes a booster circuit 31 in addition to the configuration of the CMOS image sensor illustrated in FIG. 1. The booster circuit 31 is able to boost the power supply voltage Ng input to the power supply terminal T1 and supply it to the regulator 18.

When the power supply voltage Ng is supplied to the power supply terminal T1, the power supply voltage Ng is output to the booster circuit 31. When the power supply voltage Ng is output to the booster circuit 31, the power supply voltage Ng is boosted, so that a power supply voltage Ng3 is generated and supplied to the regulator 18. When the power supply voltage Ng3 is supplied to the regulator 18, a power supply voltage Rg3 in which power supply noise of the power supply voltage Ng3 is suppressed is generated.

When a signal is to be read out from the pixels 15 illustrated in FIG. 8, the switch S11 is turned on and the switch S12 is turned off, so that the power supply voltage Ng supplied to the power supply terminal T1 is output to each pixel 15.

While the power supply voltage Ng is being output to each pixel 15, the potential of the vertical signal line NSIG is shifted to the reset level and the sample-hold signal conversion circuit 16 performs sampling of the reset level.

When the sample-hold signal conversion circuit 16 performs the sampling of the reset level, the switch S11 is turned off and the switch S12 is turned on, so that the power supply voltage Rg3 generated by the regulator 18 is output to each pixel 15.

While the power supply voltage Rg3 is being output to each pixel 15, the voltage of the vertical signal line NSIG is shifted to the read level and the sample-hold signal conversion circuit 16 performs sampling of the read level.

Consequently, even when the power supply voltage Ng provided for a single system is used, it is possible to suppress power supply noise of the power supply voltage Rg3 to be supplied to the pixels 15 without degrading read performance at the time of the sampling of the read level. As a result, it is possible to improve an S/N ratio of a signal read out from the pixels 15 without decreasing a read speed.

In the third embodiment illustrated in FIG. 8, a method is described in which the sample-hold signal conversion circuits 16 are used to detect a signal read out from each pixel 15. However, an ADC circuit may be used instead of the sample-hold signal conversion circuits 16.

(Fourth Embodiment)

Figure 9:
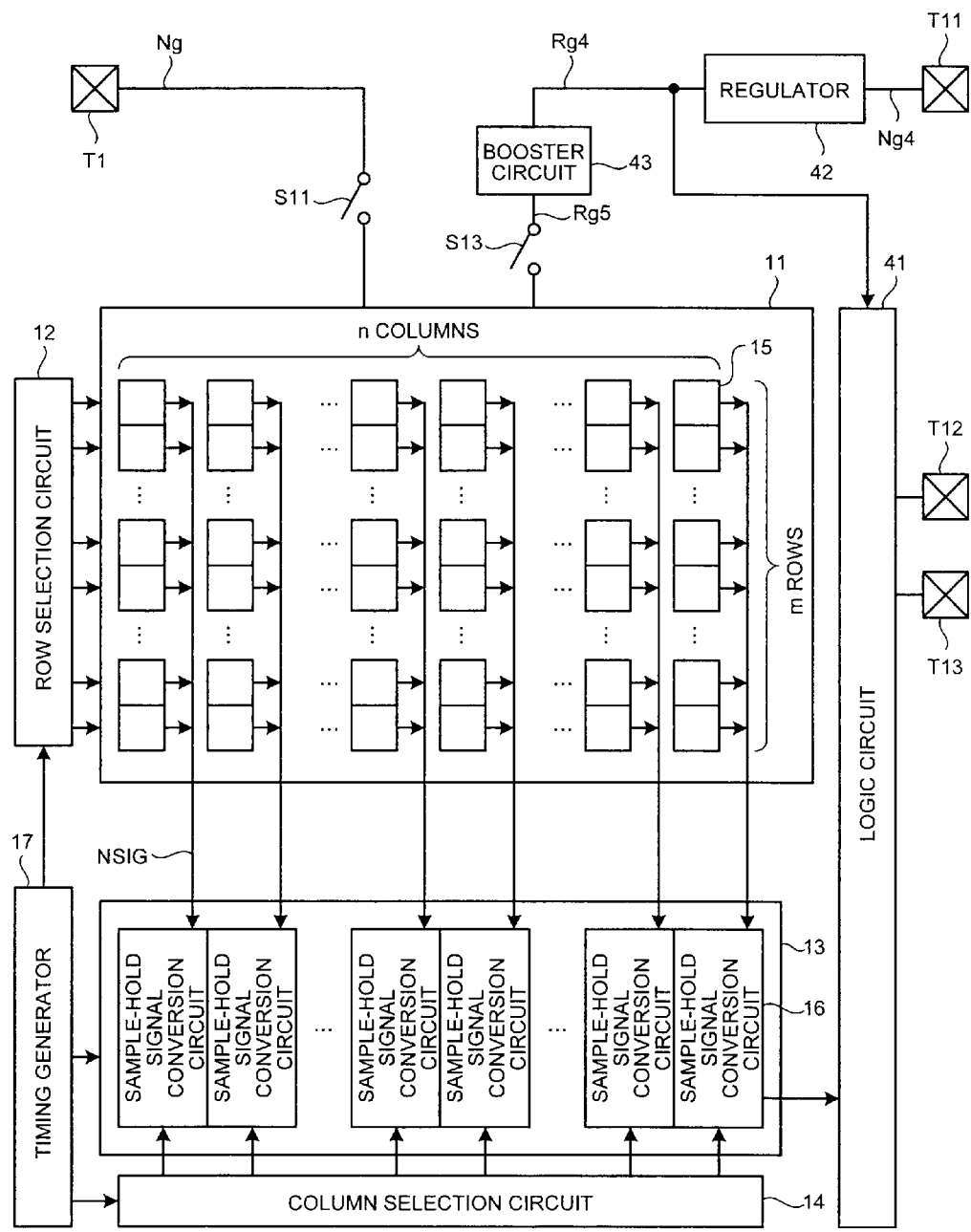
FIG. 9 is a block diagram of a general configuration of a CMOS image sensor to which a power-supply-noise cancelling circuit according to a fourth embodiment of the present invention is applied.

FIG. 9 is a block diagram of a general configuration of a CMOS image sensor to which a power-supply-noise cancelling circuit according to a fourth embodiment of the present invention is applied.

In FIG. 9, the CMOS image sensor includes a logic circuit 41, a regulator 42, a booster circuit 43, a switch S13, a power supply terminal T11, and output terminals T12 and T13, instead of the regulator 18 and the row selection circuit 12 of the CMOS image sensor illustrated in FIG. 1. The logic circuit 41 is able to generate a differential signal by performing image processing on a signal output from the sample-hold signal conversion circuit group 13. The regulator 42 is able to generate a power supply voltage Rg4 in which a noise component is suppressed, from a power supply voltage Ng4 containing a noise component. The regulator 42 may be configured in the same manner as illustrated in FIG. 4. The booster circuit 43 is able to boost the power supply voltage Rg4 generated by the regulator 42. The switch S13 is able to switch a power supply voltage to be supplied to each pixel 15 to the power supply voltage Rg4 in which the noise component is suppressed. The power supply terminal T11 is able to input the power supply voltage Ng4. The power supply voltage Ng4 may be superimposed with power supply noise. The output terminals T12 and T13 are able to output a differential signal obtained through the image processing by the logic circuit 41.

When the power supply voltage Ng4 is supplied to the power supply terminal T11, the power supply voltage Ng4 is supplied to the regulator 42. When the power supply voltage Ng4 is supplied to the regulator 42, the power supply voltage Rg4 in which the power noise of the power supply voltage Ng4 is suppressed is generated, and is output to the logic circuit 41 and the booster circuit 43. When the power supply voltage Ng4 is output to the booster circuit 43, the power supply voltage Ng4 is boosted, so that a power supply voltage Rg5 is generated.

When a signal is to be read out from the pixels 15 illustrated in FIG. 9, the switch S11 is turned on and the switch S13 is turned off, so that the power supply voltage Ng supplied to the power supply terminal T1 is output to each pixel 15.

While the power supply voltage Ng is being output to each pixel 15, the potential of the vertical signal line NSIG is shifted to the reset level and the sample-hold signal conversion circuit 16 performs sampling of the reset level.

When the sample-hold signal conversion circuit 16 performs the sampling of the reset level, the switch S11 is turned off and the switch S13 is turned on, so that the power supply voltage Rg5 boosted by the booster circuit 43 is output to each pixel 15.

While the power supply voltage Rg5 is being output to each pixel 15, the voltage of the vertical signal line NSIG is shifted to the read level and the sample-hold signal conversion circuit 16 performs sampling of the read level.

Consequently, with use of the regulator 42 that stabilizes a voltage to be supplied to the logic circuit 41, it is possible to suppress power supply noise of the power supply voltage Rg5 to be supplied to the pixels 15. As a result, it is possible to improve an S/N ratio of a signal read out from the pixels 15 without providing a dedicated regulator for the pixels 15.

In this case, the voltage value of the power supply voltage Ng may be 2.8 V for example, and the voltage value of the power supply voltage Ng4 may be 1.5V for example.

In the fourth embodiment illustrated in FIG. 9, a method is described in which the sample-hold signal conversion circuits 16 are used to detect a signal read out from each pixel 15. However, an ADC circuit may be used instead of the sample-hold signal conversion circuits 16.

(Fifth Embodiment)

Figure 10:
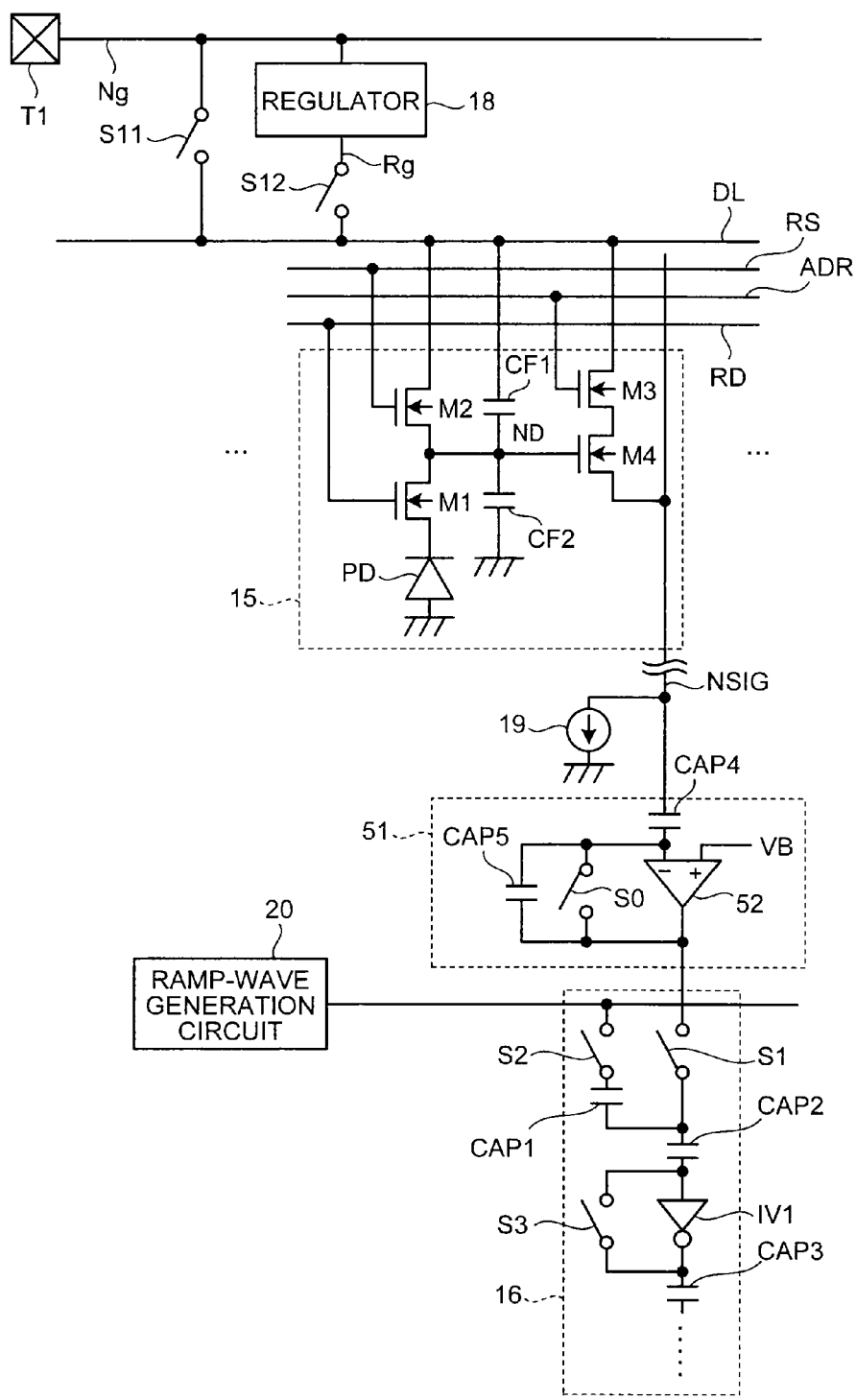
FIG. 10 is a block diagram of a general configuration of a CMOS image sensor to which a power-supply-noise cancelling circuit according to a fifth embodiment of the present invention is applied.

FIG. 10 is a block diagram of a general configuration of a CMOS image sensor to which a power-supply-noise cancelling circuit according to a fifth embodiment of the present invention is applied.

In FIG. 10, the CMOS image sensor includes an amplifier 51 in addition to the configuration illustrated in FIG. 2. The amplifier 51 is connected to a preceding stage of the sample-hold signal conversion circuit 16 and is able to amplify a signal of the vertical signal line NSIG and output the amplified signal to the sample-hold signal conversion circuit 16.

The amplifier 51 includes an operational amplifier 52, a switch S0, and capacitors CAP4 and CAPS. An inverting input terminal of the operational amplifier 52 is connected to the vertical signal line NSIG via the capacitor CAP5. The switch S0 and the capacitor CAP4 are connected in parallel between the inverting input terminal and an output terminal of the operational amplifier 52. A bias voltage Vb is input to a non-inverting input terminal of the operational amplifier 52.

Figure 11:
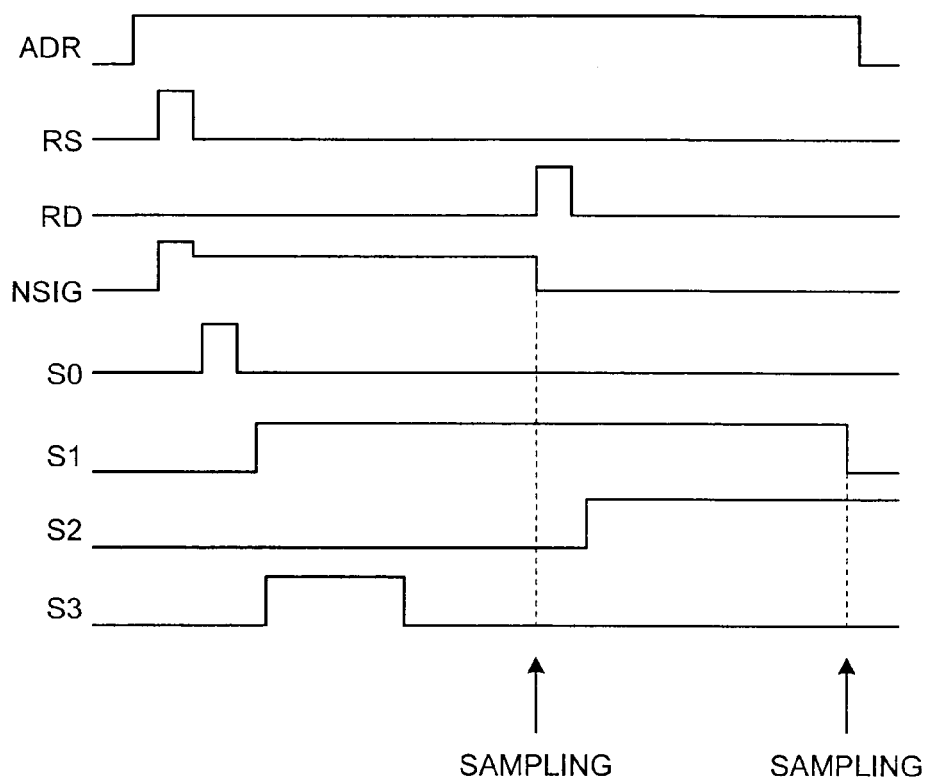
FIG. 11 is a timing diagram illustrating signal waveforms of respective units of the CMOS image sensor when switches S0 to S3 illustrated in FIG. 10 are turned on and off.

FIG. 11 is a timing diagram illustrating signal waveforms of respective units of the CMOS image sensor when the switches S0 to S3 illustrated in FIG. 10 are turned on and off.

In FIG. 11, when the switch S0 illustrated in FIG. 10 is turned on after the reset pulse is output to the reset signal line RS and before the switch S1 is turned on, the output terminal of the operational amplifier 52 and the inverting input terminal of the operational amplifier 52 are short circuited, so that a voltage of one end of the capacitor CAP4 reaches an output voltage of the output terminal of the operational amplifier 52.

When the switch S0 is turned off and the switch S1 is turned on, the voltage of the vertical signal line NSIG is amplified by the operational amplifier 52 and then output to the sample-hold signal conversion circuit 16.

When a signal is to be read out from the pixels 15, the switch S11 is turned on and the switch S12 is turned off, so that the power supply voltage Ng supplied to the power supply terminal T1 is output to each pixel 15 and the sample-hold signal conversion circuit 16 performs sampling of the reset level. When the sample-hold signal conversion circuit 16 performs the sampling of the reset level, the switch S11 is turned off and the switch S12 is turned on, so that the power supply voltage Rg generated by the regulator 18 is output to each pixel 15 and the sample-hold signal conversion circuit 16 performs sampling of the read level.

In the fifth embodiment illustrated in FIG. 10, a method is described in which the sample-hold signal conversion circuits 16 are used to detect a signal read out from each pixel 15. However, an ADC circuit may be used instead of the sample-hold signal conversion circuits 16.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power-supply-noise cancelling circuit comprising:
   a switching unit that switches between a power supply voltage containing a noise component and a power supply voltage in which the noise component is suppressed, and supplies switched power supply voltage to each pixel of an imaging element; and
   a timing generator that controls the switching unit so that the power supply voltage containing the noise component is supplied to the pixels at the time of sampling of a reset level of a signal read out from the pixels and the power supply voltage in which the noise component is suppressed is supplied to the pixels at the time of sampling of a read level of a signal read out from the pixels.

2. The power-supply-noise cancelling circuit according to claim 1, further comprising a regulator that generates the power supply voltage in which the noise component is suppressed.

3. The power-supply-noise cancelling circuit according to claim 2, wherein
   the regulator generates the power supply voltage in which the noise component is suppressed, from a power supply voltage having a voltage value larger than a voltage value of the power supply voltage containing the noise component.

4. The power-supply-noise cancelling circuit according to claim 2, further comprising a booster circuit that boosts the power supply voltage containing the noise component, and supplies boosted power supply voltage to the regulator.

5. The power-supply-noise cancelling circuit according to claim 4, wherein
   the timing generator supplies the power supply voltage containing the noise component to the pixels at the time of sampling of a reset level of a signal read out from the pixels, and supplies the power supply voltage boosted by the booster circuit to the pixels at the time of sampling of a read level of a signal read out from the pixels.

6. The power-supply-noise cancelling circuit according to claim 2, wherein
   the regulator includes
   a bias circuit that generates a reference voltage;
   a resistor that divides a power supply voltage;
   an error amplifier that compares the power supply voltage divided by the resistor with the reference voltage; and
   a voltage-controlled current source that controls a current flowing into the resistor so that a voltage output from the error amplifier comes closer to zero.

7. A solid-state imaging device comprising:
   a pixel array in which pixels are arrayed in a matrix form;
   a sample-hold signal conversion circuit that detects a signal component read out from the pixels by CDS;
   a vertical signal line for transferring a signal read out from the pixels to the sample-hold signal conversion circuit;
   a switching unit that switches between a power supply voltage containing a noise component and a power supply voltage in which the noise component is suppressed, and supplies switched power supply voltage to each pixel of the pixel array; and
   a timing generator that controls the switching unit so that the power supply voltage containing the noise component is supplied to the pixels at the time of sampling of a reset level of a signal read out from the pixels, and the power supply voltage in which the noise component is suppressed is supplied to the pixels at the time of sampling of a read level of a signal read out from the pixels.

8. The solid-state imaging device according to claim 7, further comprising a regulator that generates the power supply voltage in which the noise component is suppressed.

9. The solid-state imaging device according to claim 8, wherein
   the regulator generates the power supply voltage in which the noise component is suppressed, from a power supply voltage having a voltage value larger than a voltage value of the power supply voltage containing the noise component.

10. The solid-state imaging device according to claim 9, further comprising a booster circuit that boosts the power supply voltage containing the noise component, and supplies boosted power supply voltage to the regulator.

11. The solid-state imaging device according to claim 10, wherein
    the timing generator supplies the power supply voltage containing the noise component to the pixels at the time of sampling of a reset level of a signal read out from the pixels, and supplies the power supply voltage boosted by the booster to the pixels at the time of sampling of a read level of a signal read out from the pixels.

12. The solid-state imaging device according to claim 8, wherein the regulator includes
    a bias circuit that generates a reference voltage;
    a resistor that divides a power supply voltage;
    an error amplifier that compares the power supply voltage divided by the resistor with the reference voltage; and
    a voltage-controlled current source that controls a current flowing into the resistor so that a voltage output from the error amplifier comes closer to zero.

13. The solid-state imaging device according to claim 7, wherein each pixel includes
    a photodiode that performs photoelectric conversion;
    a read transistor that reads out charge stored in the photodiode to a storage node;
    a reset transistor that resets charge stored in the storage node;
    a row selection transistor that selects a row;
    a transfer transistor that transfers charge stored in the storage node to the vertical signal line.

* * * * *

UNITED STATES PATENT AND TRADEMARK OFFICE
CERTIFICATE OF CORRECTION

| | |
|---|---|
| PATENT NO. | : 8,531,591 B2 |
| APPLICATION NO. | : 12/725870 |
| DATED | : September 10, 2013 |
| INVENTOR(S) | : Ryuta Okamoto et al. |

It is certified that error appears in the above-identified patent and that said Letters Patent is hereby corrected as shown below:

On the title page, Item (75), the 1st inventor's city and state of residence is incorrect. Item (75) should read:

--(75) Inventors: Ryuta Okamoto, Palo Alto, California;
                Kazumasa Sanada, Kanagawa (JP)--

Signed and Sealed this
Nineteenth Day of November, 2013

Teresa Stanek Rea
*Deputy Director of the United States Patent and Trademark Office*